(12) United States Patent
Davidson et al.

(10) Patent No.: US 11,693,800 B2
(45) Date of Patent: Jul. 4, 2023

(54) MANAGING IO PATH BANDWIDTH

(71) Applicant: EMC IP Holding Company LLC, Hopkinton, MA (US)

(72) Inventors: James Davidson, Tyngsboro, MA (US); Alan Rajapa, North Smithfield, RI (US); Scott Rowlands, Marietta, GA (US); Igor Fradkin, Sharon, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 11 days.

(21) Appl. No.: 16/927,045

(22) Filed: Jul. 13, 2020

(65) Prior Publication Data

US 2022/0012200 A1   Jan. 13, 2022

(51) Int. Cl.
*G06F 13/362* (2006.01)
*G06F 13/40* (2006.01)

(52) U.S. Cl.
CPC ........ *G06F 13/362* (2013.01); *G06F 13/4022* (2013.01)

(58) Field of Classification Search
CPC ....... H04L 45/22; H04L 45/125; H04L 47/20; H04L 47/50; H04L 49/00; H04L 49/70; H04L 41/0213; H04L 41/06; H04L 41/0654; H04L 47/125; H04L 45/28; H04L 49/356; H04L 49/90; H04L 47/10; H04L 47/11; H04L 47/122; H04L 47/22; H04L 47/746
USPC ................ 370/225, 235, 217, 229, 237, 351
See application file for complete search history.

(56) References Cited

U.S. PATENT DOCUMENTS

| | | | | |
|---|---|---|---|---|
| 4,890,226 A | * | 12/1989 | Itoh | G06T 1/60 400/279 |
| 5,136,699 A | * | 8/1992 | Yokoyama | G06F 9/355 712/E9.042 |
| 6,349,357 B1 | * | 2/2002 | Chong, Jr. | G06F 3/0613 711/111 |
| 6,370,605 B1 | * | 4/2002 | Chong, Jr. | G06F 3/0613 710/33 |
| 6,570,881 B1 | * | 5/2003 | Wils | H04L 41/046 370/225 |
| 6,934,253 B2 | * | 8/2005 | Hoogenboom | H04L 49/503 370/413 |
| 7,318,138 B1 | * | 1/2008 | Usgaonkar | G06F 11/2092 711/163 |

(Continued)

*Primary Examiner* — Faisal M Zaman
(74) *Attorney, Agent, or Firm* — Muirhead and Saturnelli, LLC

(57) ABSTRACT

Bandwidth consumption for IO paths between a storage system and host may be managed. It may be determined whether there is congestion on a front-end port (FEP) link. For example, the storage system may monitor for a notification from the switch in accordance with a Fibre Channel (FC) protocol. If a notification is received indicating congestion on an FEP link, the bandwidth thresholds (BWTs) for one or more IO paths between the storage system and one or more hosts that include the FEP link may be reduced. The host port BWTs may continue to be reduced until a congestion notification communication has not been received for a predetermined amount of time, in response to which the host port BWTs for one or more host port links on IO paths that include the FEP link may be increased. Similar techniques may be employed for an FEP link determined to be faulty.

17 Claims, 8 Drawing Sheets

(56) References Cited

U.S. PATENT DOCUMENTS

| Patent/Publication | Date | Inventor | Classification |
|---|---|---|---|
| 7,613,116 B1* | 11/2009 | Medina | H04L 49/508 370/235 |
| 7,720,980 B1* | 5/2010 | Hankins | H04L 41/0896 709/229 |
| 7,830,797 B1* | 11/2010 | Nachum | H04L 47/10 370/230.1 |
| 8,204,980 B1* | 6/2012 | Sandstrom | G06F 11/0727 709/224 |
| 8,948,009 B1* | 2/2015 | Hasan | H04L 47/193 370/231 |
| 9,237,034 B2* | 1/2016 | Huang | H04L 45/22 |
| 9,237,107 B2* | 1/2016 | Ansari | H04L 47/30 |
| 9,660,914 B1* | 5/2017 | Zhou | H04L 43/062 |
| 11,366,870 B1* | 6/2022 | Yanacek | G06F 16/9574 |
| 2005/0157752 A1* | 7/2005 | Takase | H04L 67/1097 370/468 |
| 2005/0259632 A1* | 11/2005 | Malpani | H04L 67/101 370/351 |
| 2006/0126509 A1* | 6/2006 | Abi-Nassif | H04L 47/11 370/235 |
| 2007/0115846 A1* | 5/2007 | Kooyers | H04L 43/0847 370/465 |
| 2007/0140020 A1* | 6/2007 | Torabi | G06F 3/0658 365/189.05 |
| 2008/0075003 A1* | 3/2008 | Lee | H04L 47/824 370/235 |
| 2008/0077702 A1* | 3/2008 | Posamentier | H04L 65/80 709/232 |
| 2008/0267073 A1* | 10/2008 | Thaler | H04L 43/0894 370/236 |
| 2009/0116507 A1* | 5/2009 | Kanda | H04L 47/263 370/464 |
| 2010/0165840 A1* | 7/2010 | Khan | H04L 43/0864 370/232 |
| 2012/0163176 A1* | 6/2012 | Matsuoka | H04L 47/10 370/235 |
| 2012/0324146 A1* | 12/2012 | Marks | G06F 3/0613 711/E12.001 |
| 2013/0163430 A1* | 6/2013 | Gell | H04N 21/23439 370/235 |
| 2014/0098672 A1* | 4/2014 | Zhang | H04L 47/33 370/236 |
| 2014/0254357 A1* | 9/2014 | Agarwal | H04L 47/12 370/229 |
| 2014/0289381 A1* | 9/2014 | Morton | H04L 47/38 709/221 |
| 2014/0351545 A1* | 11/2014 | Nakajima | G06F 3/0617 711/170 |
| 2015/0095445 A1* | 4/2015 | Thankappan | H04L 67/1097 709/214 |
| 2015/0281102 A1* | 10/2015 | Lee | H04L 47/621 370/236 |
| 2016/0134363 A1* | 5/2016 | Buckland | H04L 45/22 398/5 |
| 2018/0013677 A1* | 1/2018 | Tang | H04L 43/12 |
| 2018/0081846 A1* | 3/2018 | Compton | G06F 13/4027 |
| 2018/0083868 A1* | 3/2018 | Cheng | H04L 45/44 |
| 2018/0255477 A1* | 9/2018 | Borch | H04W 72/0453 |
| 2019/0182161 A1* | 6/2019 | Ravi | H04L 47/263 |
| 2019/0317665 A1* | 10/2019 | Xu | G06F 3/067 |
| 2019/0342199 A1* | 11/2019 | Hurson | H04L 67/1097 |
| 2019/0386924 A1* | 12/2019 | Srinivasan | H04L 47/122 |
| 2020/0120029 A1* | 4/2020 | Sankaran | H04L 12/44 |
| 2020/0236052 A1* | 7/2020 | Srinivasan | H04L 43/106 |
| 2020/0280518 A1* | 9/2020 | Lee | H04L 47/30 |
| 2020/0379808 A1* | 12/2020 | Eilert | H04L 41/0896 |
| 2020/0396170 A1* | 12/2020 | Gafni | H04L 47/263 |
| 2022/0012200 A1* | 1/2022 | Davidson | G06F 13/362 |
| 2022/0078118 A1* | 3/2022 | Ao | H04L 47/26 |
| 2022/0187991 A1* | 6/2022 | Keller | G06F 3/0683 |
| 2022/0191127 A1* | 6/2022 | Kopser | H04L 45/122 |

\* cited by examiner

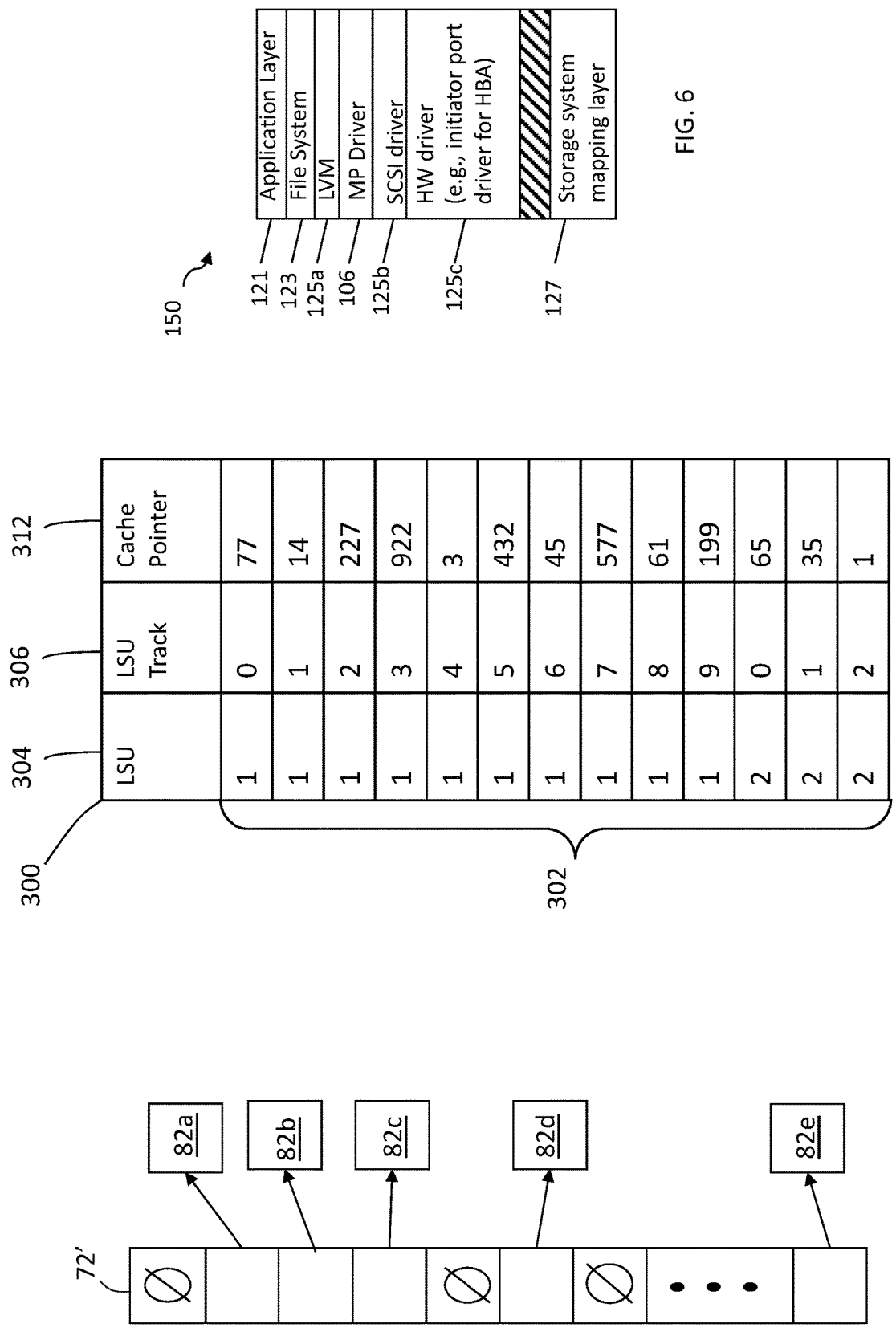

| LSU | Host Port | Front-End Port | Other Info |
|---|---|---|---|
| Dev0 | WWN12 | WWN45 | |
| Dev1 | WWN9 | WWN117 | |
| ... | | | |
| Devn | WWN77 | WWN6 | |

| Initiator Port | Target Port | Other Info |
|---|---|---|
| WWW1 | WWW3 | |
| WWW7 | WWW8 | |
| ... | | |
| WWW9 | WWW2 | |

| Host Port | Default BWT (Gbps) | Current BWT (Gbps) | Other Info |
|---|---|---|---|
| WWN12 | 16 | 12 | |
| WWN9 | 4 | 4 | |
| WWN77 | 8 | 5 | |

MANAGING IO PATH BANDWIDTH

BACKGROUND

Technical Field

This application generally relates to data storage systems, and more particularly to managing IO bandwidth limits on a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (IO) operations utilizing a physical storage device of the storage system, one or more components of the host system, storage system and network components therebetween may be used. The one or more combinations of components of the host, switch and storage system over which IO operations between an application and storage device can be communicated may be considered an IO path between the application and the storage device. These IO paths define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In an embodiment of the invention, a method is performed for a system including a storage system coupled to a host by a switch, where a plurality of IO paths are defined between the host and the storage system across the switch, each IO path having a defined bandwidth threshold. The method includes determining that there is congestion on a physical link between a first switch port of the switch and a first array port of the array, or the physical link is faulty, and, for one or more of the plurality of IO paths that include the first array port, reducing the bandwidth threshold defined for the IO path in response to the determination. Determining may include receiving a first notification from the switch indicating that there is congestion on the physical link. The method may further include, after receiving the first notification, receiving a second notification from the switch indicating that there is congestion on the physical link, and, for the one or more of the plurality of IO paths that include the first array port, further reducing the bandwidth threshold defined for the IO path in response to receiving the second notification. The method may further include, after receiving the first notification, determining that there has not been received in a predefined amount of time another notification from the switch indicating that there is congestion on the physical link, and, for the one or more of the plurality of IO paths that include the first array port, increasing the bandwidth threshold defined for the IO path in response to the determination that another notification has not been received in the predefined amount of time. Determining may include receiving a first notification from the switch indicating that the physical link is faulty. The method may further include determining that the host system supports multi-path processing. Reducing the bandwidth threshold defined for the IO path may increases response times for IO operations on the one or more IO paths, and the method may further include the host system detecting the increased response times on the one or more IO paths, and the host system reducing an amount if IO communication sent to the one or more IO paths in response to detecting the increased response times.

In another embodiment of the invention, a storage system is coupled to a host by a switch, where a plurality of IO paths are defined between the host and the storage system across the switch, each IO path having a defined bandwidth threshold. The storage system includes executable logic that implements a method including determining that: there is congestion on a physical link between a first switch port of the switch and a first array port of the array, or the physical link is faulty, and, for one or more of the plurality of IO paths that include the first array port, reducing the bandwidth threshold defined for the IO path in response to the determination. The determining may include receiving a first notification from the switch indicating that there is congestion on the physical link. The method may further includes, after receiving the first notification, receiving a second notification from the switch indicating that there is congestion on the physical link, and, for the one or more of the plurality of IO paths that include the first array port, further reducing the bandwidth threshold defined for the IO path in response to receiving the second notification. The method may further include, after receiving the first notification, determining that there has not been received in a predefined amount of time another notification from the switch indicating that there is congestion on the physical link, and, for the one or more of the plurality of IO paths that include the first array port, increasing the bandwidth threshold defined for the IO path in response to the determination that another notification has not been received in the predefined amount of time. The determining may include receiving a first notification from the switch indicating that the physical link is faulty. The method further may include determining that the host system supports multi-path processing. Reducing the bandwidth threshold defined for the IO path may increase response times for IO operations on the one or more IO paths. The method further may include the host system detecting the increased response times on the one or more IO paths, and the host system reducing an amount if IO communication sent to the one or more IO paths in response to detecting the increased response times.

In another embodiment of the invention, computer-readable media is provided for a system including a storage system coupled to a host by a switch, wherein a plurality of IO paths are defined between the host and the storage system across the switch, each IO path having a defined bandwidth threshold. The computer-readable media includes executable code that determines that: there is congestion on a physical link between a first switch port of the switch and a first array port of the array, or the physical link is faulty, and executable code that, for one or more of the plurality of IO paths that include the first array port, reduces the bandwidth threshold defined for the IO path in response to the determination. The determining may include receiving a first notification from the switch indicating that there is congestion on the physical link.

The software may further include executable code that, after receiving the first notification, receives a second notification from the switch indicating that there is congestion on the physical link, and executable code that, for the one or more of the plurality of IO paths that include the first array port, controls further reducing the bandwidth threshold defined for the IO path in response to receiving the second notification. The software may further include executable code that determines, after receiving the first notification, that there has not been received in a predefined amount of time another notification from the switch indicating that there is congestion on the physical link and executable code that, for the one or more of the plurality of IO paths that include the first array port, increases the bandwidth threshold defined for the IO path in response to the determination that another notification has not been received in the predefined amount of time. The determining may include receiving a first notification from the switch indicating that the physical link is faulty. Reducing the bandwidth threshold defined for the IO path increases response times for IO operations on the one or more IO paths, and where the computer-readable media further may include executable code that determines that the host system supports multi-path processing, executable code that controls the host system to detect the increased response times on the one or more IO paths, and executable code that controls the he host system to reduce an amount if IO communication sent to the one or more IO paths in response to detecting the increased response times.

BRIEF DESCRIPTION OF THE DRAWINGS

Features and advantages of the present invention will become more apparent from the following detailed description of illustrative embodiments thereof taken in conjunction with the accompanying drawings in which:

FIG. 3B a block diagram illustrating an example of a table used for a thin logical device, according to embodiments of the invention;

FIG. 4 is a block diagram illustrating an example of a data structure for mapping logical storage unit tracks to cache slots, according to embodiments of the invention;

FIG. 6 is a block diagram illustrating an example of a plurality of logical layers of a combination of a host system and a data storage system for processing an IO request, according to embodiments of the invention;

DETAILED DESCRIPTION OF EMBODIMENTS

Figure 1:
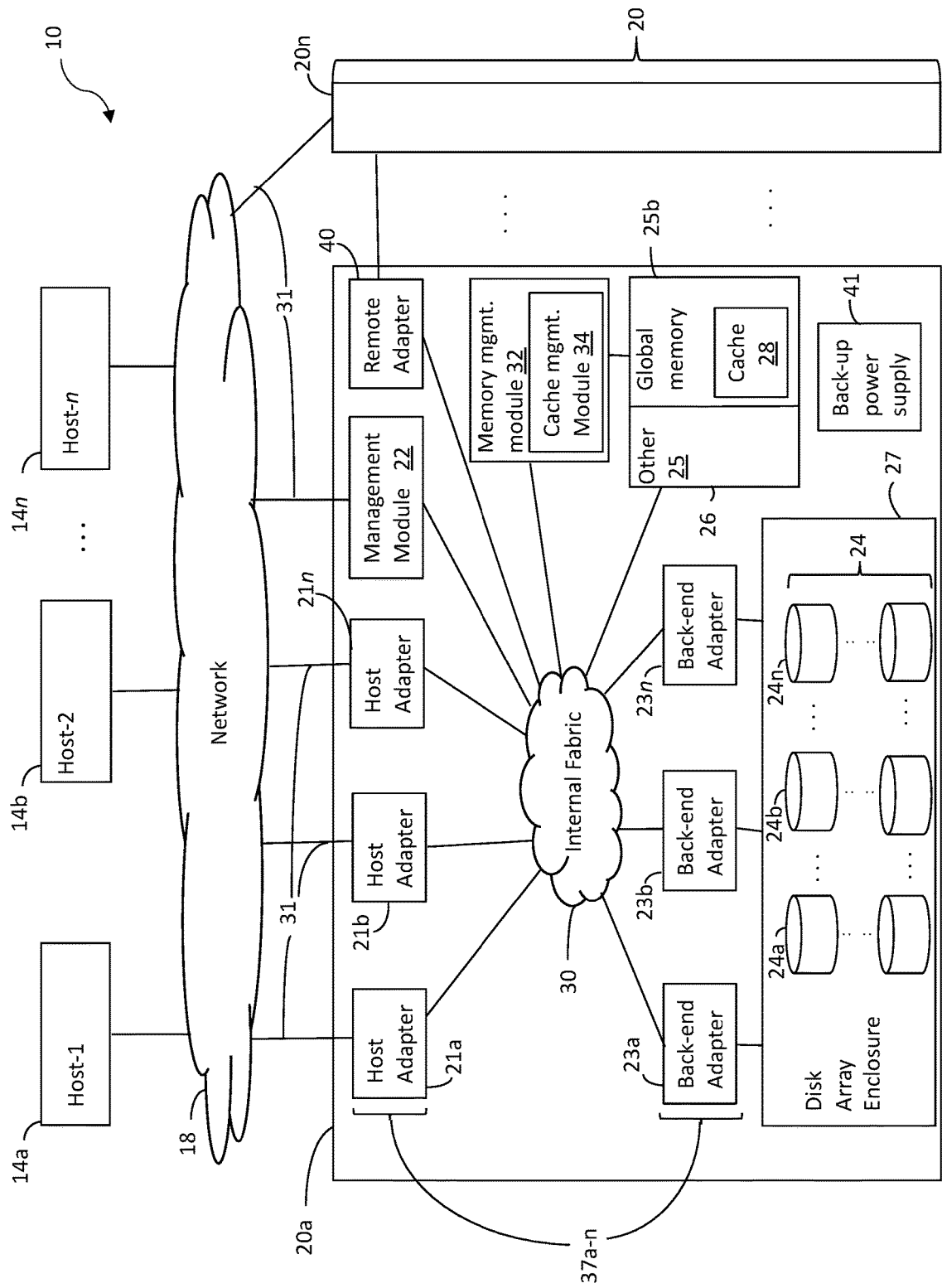
FIG. 1 is a block diagram illustrating an example of a data storage network, according to embodiments of the invention.

There may exist multiple I/O paths between a storage system and a host system across a switch that couples the storage system to the host system. Each IO path may include an initiator and a target, where the initiator is a port of the host system, i.e., a host port, and each target is a port of a storage system, i.e., a storage system port, which may be referred to herein as a front-end port (FEP) as described in more detail elsewhere herein. Each host port (initiator) may be connected by a single physical link (e.g., an electrical or fiber optic cable) to a single dedicated port of the switch referred to herein as a switch host port (SUP) or fabric port, and each FEP (target) may be connected by a single physical link to a single dedicated port of the switch referred to herein as a switch storage port (SSP), as described in more detail herein. While a switch includes many possible physical paths between an SHP and SSP, a zoning table (described in more detail elsewhere herein) or the like may define the permissible or zoned paths between SHPs and SSPs of the switch. As each SHP is dedicated to a host port (initiator) and each SSP is dedicated to an FEP (target), a zone path may be defined in terms of an initiator-target (I-T) pair.

Configuring a storage network may include, for example, connecting host ports to SHPs and FEPs to SSPs, defining zones, provisioning storage, masking LSUs to FEPs and host ports (as described in more detail elsewhere herein), etc. During the configuration process, or in response to new components being added to the storage network, or during recovering from a failure, hosts and storage systems may separately log into switches. During the log-in process between the host and the switch, for each host port of a host that is physically connected to an SUP, the host may negotiate a maximum bandwidth threshold (BWT; i.e., the maximum throughput) for the physical link (hereinafter "link") between the host port and the SUP (i.e., fabric port) to which the host port is connected by the link. Also, during the log-in process between the storage system and the switch, independent of the log-in process between the host and the switch, for each FEP of a storage system physically connected to an SSP of the switch, the storage system may negotiate a BWT for the link between the FEP and the SSP to which the host port is connected by the link. For a given IO path, as a result of the foregoing independent BWT negotiations, the negotiated BWT for the link between the host port and the SUP (i.e., the host port link) and the negotiated BWT for the link between the FEP and the SSP (i.e., the FEP link) may be different. The negotiated BWT for the host port link on an IO path may be referred to herein as the "host port BWT", and the negotiated BWT for the FEP link on an IO path may be referred to herein as the "FEP BWT".

A host port BWT being less than an FEP BWT on an IO path may cause congestion on an IO path. Further, this bandwidth mismatch may spread to cause congestion on other IO paths. For example, if the FEP BWT is sending IO onto the FEP link of the IO path (e.g., in response to read operations) at a faster rate than the IO can be transmitted to the host port on the host port link, the switch may use its credit buffers to queue IO communications until enough bandwidth is available on the host port link to transmit the IO data to the host port. For small differences between FEP BWT and host port BWT, use of the credit buffers may be sufficient to avoid unacceptably high response times. However, if the differences between FEP BWT and host port BWT are too big, use of credit buffers may be insufficient to avoid congestion. For example, the communications on the IO path may consume so much of the credit buffer space that not enough credit buffer space is available to manage bandwidth on the IO path, as well as on other IO paths because there may not be enough remaining credit buffer space to adequately manage bandwidth the other IO paths.

To prevent congestion spreading caused by a bandwidth mismatch on an IO path, an FEP BWT for a specific IO path may be defined to be the same as, or approximately the same as, the host port BWT on the IO path. That is, the FEP BWT may be defined to be less that than the FEP BWT negotiated with the switch; i.e., to be less than a maximum capacity of the FEP link. However, such a process may require manual interaction (e.g., by a storage administrator), and further may require data analysis; e.g., forecasting based on analysis of historical bandwidth consumption between a host and storage system, which may consume significant system resources What may be desired is to address congestion spreading caused by a bandwidth mismatch on an IO path without manual interaction or significant data analysis to modify BWTs.

Described herein are mechanisms and techniques for managing bandwidth consumption for IO paths between a storage system, which includes modifying BWTs on IO paths automatically and without significant data analysis.

The storage system may monitor communications from a switch to determine whether there is congestion on an FEP link. For example, the storage system may monitor for a notification from the switch in accordance with a Fibre Channel (FC) protocol; e.g., a fabric performance impact notification (FPIN) extended link service (ELS) command that indicates congestion on the FEP link using an appropriate type-length-value (TLV) descriptor tag.

If a notification is received indicating congestion on an FEP link, the BWTs for one or more IO paths between the storage system and one or more hosts that include the FEP link may be reduced, for example, by a predefined amount (e.g., a set amount or a percentage of the current host port BWT). Switch communications may continue to be monitored, for example, at prescheduled times (e.g., periodically), and the IO path BWTs may be further reduced if congestion notifications continue to be received. The IO path BWTs may continue to be reduced until a congestion notification communication has not been received for a predetermined amount of time, in response to which the IO path BWTs for one or more IO paths that include the FEP link may be increased, for example, by a predefined amount (e.g., a set amount or a percentage of the current host port BWT). Switch communications may continue to be monitored, for example, at prescheduled times (e.g., periodically), and the IO path BWTs may be further increased if congestion notifications continue to not be received until each IO path reaches its negotiated BWT.

In some embodiments, the storage system may monitor communications from a switch to determine whether an FEP link is faulty; i.e., that the FEP exhibits faulty IO communications to at least some extent (e.g., CRC errors), which requires re-sending of IO communications or some other remedy that can degrade system performance. For example, the storage system may monitor for a notification; e.g., an FPIN from the switch in accordance with a Fibre Channel (FC) protocol that indicates that an FEP link is faulty using an appropriate TLV descriptor tag.

If a notification is received indicating that the FEP link is faulty, the IO path BWTs for one or more IO paths that include the FEP link may be reduced, for example, by a predefined amount (e.g., a set amount or a percentage of the current host port BWT). In some embodiments, this may be performed only if: the one or more hosts having at least one host port on an IO path including the FEP are multi-path enabled (i.e., are capable of identifying and selecting from among multiple IO paths); and/or each LSU masked to the FEP is multi-pathed—i.e., has multiple permitted IO paths between the FEP and one or more host systems, e.g., per a masking table on the storage system. As a result of reducing the IO path BWT(s), the hos(t) of the host ports may detect an increase in response time for IO communications (e.g., reads) involving the IO paths, and the host (e.g., a multi-path (MP) driver as described in more detail herein) may reduce an amount of IO communications it sends on such IO paths.

Switch communications may continue to be monitored, for example, at prescheduled times (e.g., periodically), until a fault notification communication has not been received for the FEP link for a predetermined amount of time (e.g., because the cause of the faultiness has been addressed), in response to which the IO path BWTs for one or more IO paths including the FEP link may be returned (i.e., increased) to the negotiated BWT of the FEP link. As a result of increasing the host port BWT(s), the hos(t) of the host ports may detect a decrease in response time for IO communications (e.g., reads) involving the FEP, and the host (e.g., an MP driver of the host) may increase an amount of IO communications it sends on IO paths including the FEP.

It should be appreciated that, while embodiments of the invention are described herein primarily in relation to determining congestion and/or faultiness on an FEP link, and adjusting IO path BWTs, the invention is not so limited. For example, similar mechanisms and techniques can be applied to determine congestion and/or faultiness on a host port link.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (IO) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of IO operations in accordance with different tasks and applications executing on the hosts. In the embodiment of FIG. 1, any one of the host computers 14a-n may issue an IO request to the storage system 20a to perform an IO operation. For example, an application executing on one of the host computers 14a-n may perform a read or write operation resulting in one or more IO requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of IO requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all IO communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for IO communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing IO operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform IO operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can 20 provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
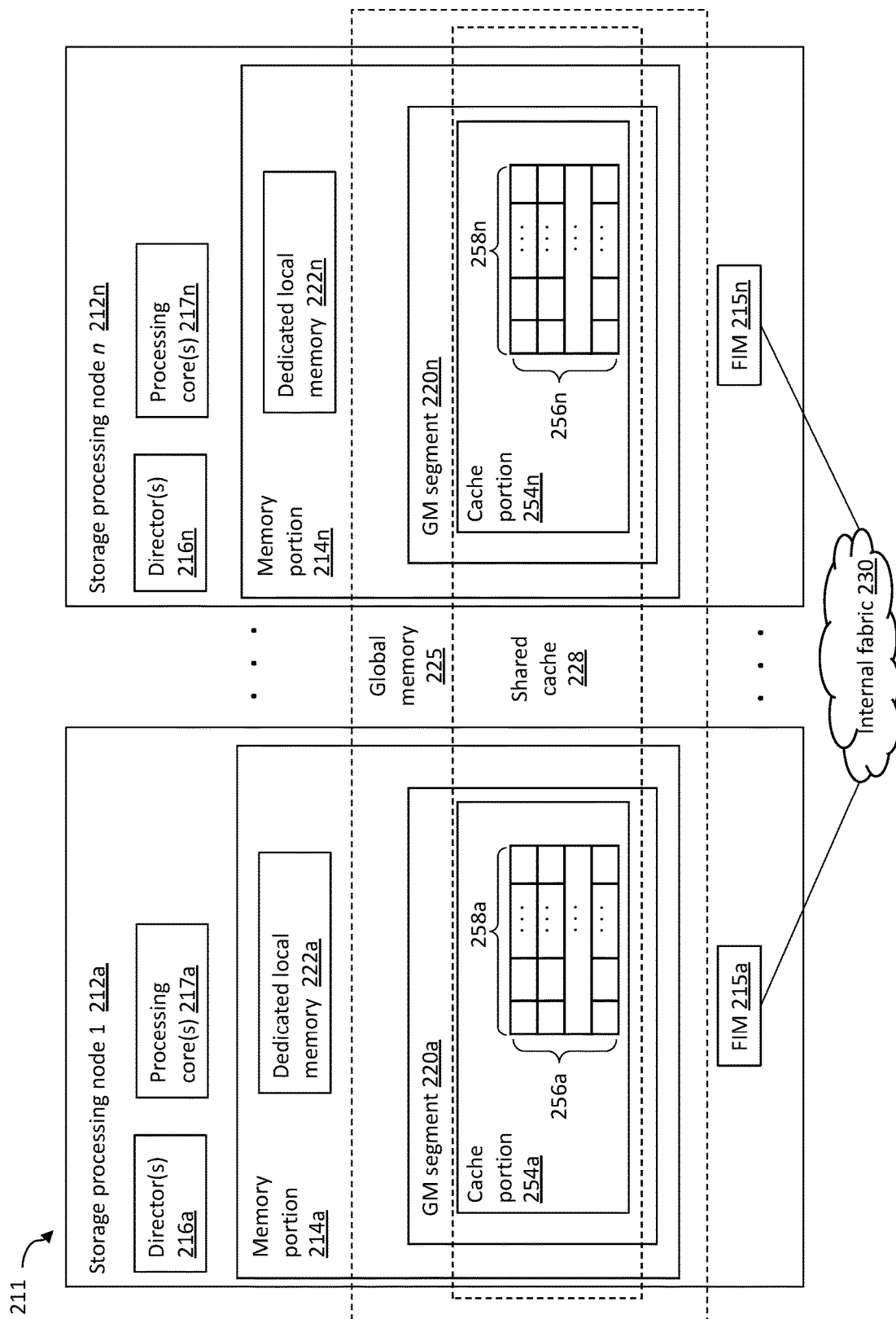
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix™, VMAX™, VMAX3™ or PowerMax™ systems made available from Dell EMC.

Host systems 14a-n may provide data and control (e.g., management and access control) information to storage systems 20a-n over a plurality of IO paths defined between the host systems and storage systems, for example, including host system components, storage system components, and network components (e.g., of network 18), and the storage systems also may provide data to the host systems across the IO paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "processing nodes." Storage system 211 may include a plurality of processing nodes 212a-212n and a fabric 230 (e.g., internal fabric 30) over which the processing nodes 212a-n may communicate. Each of the processing nodes 212a-212n may include components thereon as illustrated. The fabric 230 may include, for example, one or more switches and connections between the switch(es) and processing nodes 212a-212n. In at least one embodiment, the fabric 230 may be an IB fabric. In some embodiments, multiple processing 212a-n nodes may be implemented on a single physically discrete component; e.g., two processing nodes 212a-n may be implemented on single engine of PowerMax storage system.

In the following paragraphs, further details are described with reference to processing node 212a but each of the N processing nodes in a system may be similarly configured. For example, processing node 212a may include any of: one or more directors 216a (e.g., directors 37a-n); memory portion 214a; one or more processing cores 217a including compute resources, for example, as part of a CPUs and/or a CPU complex for processing IO operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a. However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store IO data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process IO on storage system 20a, including data structures to manage the mapping of LSUs and locations thereon to physical storage devices and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3A:
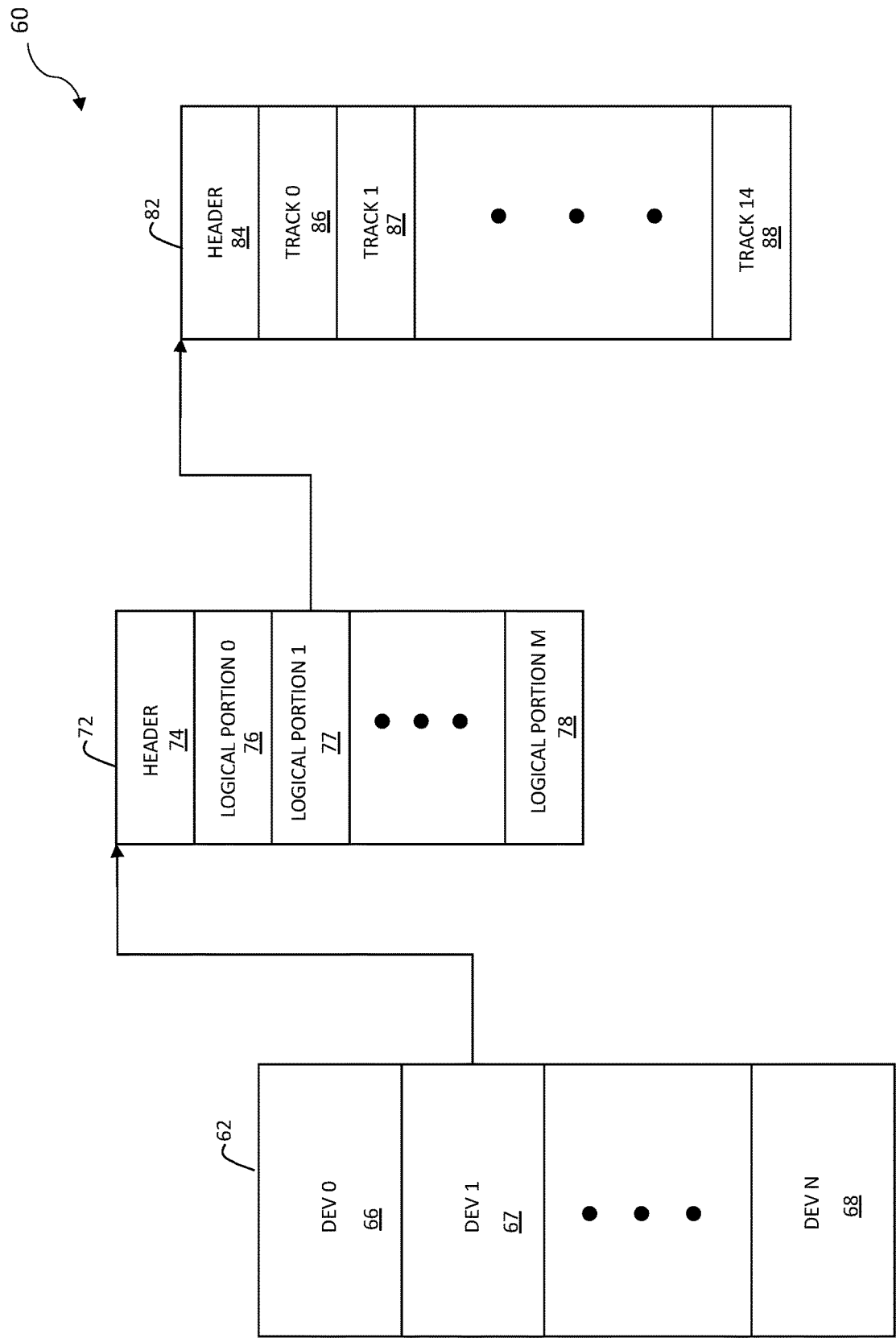
FIG. 3A is a block diagram illustrating an example of tables defining relationships between logical storage units and physical storage devices on a data storage system, according to embodiments of the invention.

FIG. 3A is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. As used herein, a "track" or "LSU track" represents a contiguous segment of physical storage space on a physical storage device. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20a (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein. A sub-element of an LSU, for example, a logical storage portion or track, may be referred to herein as a logical storage element (LSE).

FIG. 3B is a diagram illustrating an example of a table 72' used for a thin logical device (i.e., a thin LSU), which may include null pointers as well as entries similar to entries for the LSU table 72, discussed above, that point to a plurality of LSU track tables 82a-82e. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

FIG. 4 is a block diagram illustrating an example of a data structure 300 for mapping LSU tracks (e.g., thin device tracks) to cache slots of a cache. Data structure 300 may be referred to herein as a "cache slot table." Cache slot table 300 may include a plurality of entries (i.e., rows) 302, each row representing an LSU track (e.g., any of LSU tracks 86-88 in track table 82) identified by an LSU ID in column 304 and an LSU track ID (e.g., number) identified in column 306. For each entry of cache slot table 300, column 312 may specify a cache location in a cache corresponding to the logical storage device track specified by columns 304 and 306. A combination of an LSU identifier and LSU track identifier may be used to determine from columns 304 and 306 whether the data of the identified LSU track currently resides in any cache slot identified in column 312. Through use of information from any of tables 62, 72, 72' and 82 described in more detail elsewhere herein, the one or more LSU tracks of an LSU specified in an IO operation can be mapped to one or more cache slots. Further, using the same data structures, the one or more physical address ranges corresponding to the one or more LSU tracks of the LSU may be mapped to one or more cache slots.

The tables 62, 72, 72', 82 and 300 may be stored in the GM 26 of the storage system 20a during operation thereof and may otherwise be stored in non-volatile memory (i.e., with the corresponding physical storage device). In addition, tables corresponding to LSUs accessed by a particular host may be stored in local memory of the corresponding one of the FAs 21a-n. In addition, RA 40 and/or the BEs 23a-n may also use and locally store portions of the tables 62, 72, 72', 82 and 300. Other data structures may be stored in any of GM 25b, memory 25a, GM segment 220a-n and/or dedicated local memories 22a-n.

Figure 5:
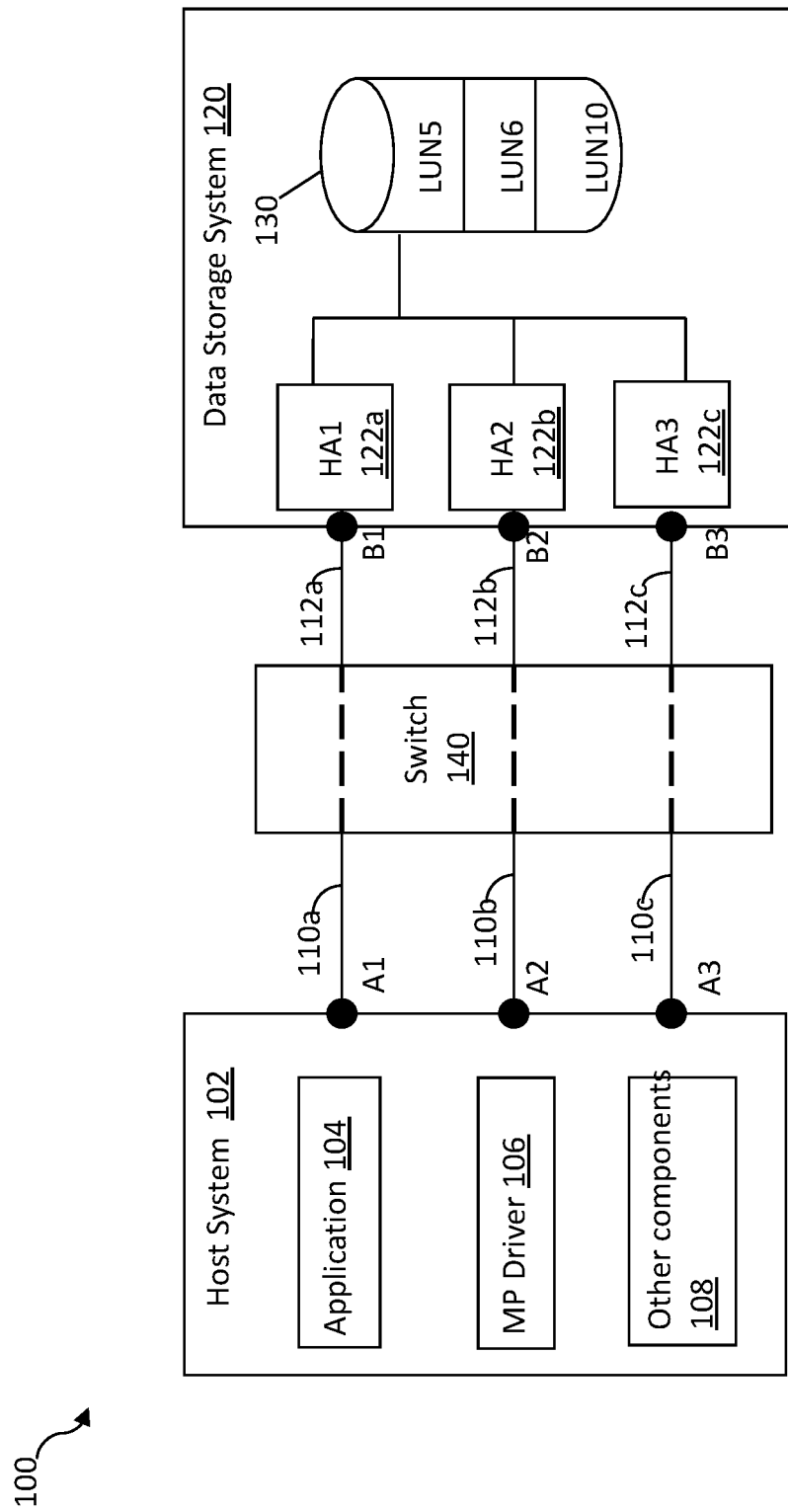
FIG. 5 is a block diagram illustrating an example of a system including a host system communicatively coupled to a data storage system via multiple I/O paths, according to embodiments of the invention.

FIG. 5 is a block diagram illustrating an example of a system 100 including a host system 102 communicatively coupled to a data storage system 120 via multiple IO paths, according to embodiments of the invention. Other embodiments of system including a host system communicatively coupled to a data storage system via multiple IO paths, for example, variations of system 100, are possible and are intended to fall within the scope of the invention. The system 100 may be implemented using one or more components of the system 10, for example, one or more storage systems 20a-n and/or one or more hosts 14a-14n, or variation thereof.

The system 100 may include a host system 102, switch 140 and data storage system 120. The host system 102 and data storage system 120 may communicate over one or more IO paths through the switch 140. Elements 110a-110c denote connections between the host system 102 and switch 140. Element 112a-112c denote connections between the data storage system 120 and the switch 140. Element 130 may represent a physical storage device of the data storage system 120, such as a rotating disk drive, flash-based or other solid state storage device, or the like, where the physical storage physical storage device 130 may be configured to include three LSUs—LUN5, LUN6 and LUN10. It should be noted that in the illustrative embodiment of FIG. 5, the system 100 includes only a single host system 102, single physical storage device 130 with 3 LSUs, a single data storage system 120, and a single switch for purposes of simplicity to illustrate the techniques herein. For example, each of the LSUs may be configured to have storage provisioned from multiple different physical storage devices rather than a single physical storage device, and multiple host systems having multiple applications executing thereon may communicate with the data storage system.

It should be appreciated that the descriptions provided in the following paragraphs may refer to particular examples using the switch 140 having a switching fabric for simplicity of illustration. Element 140 may be a single switch having a switching fabric, or a multi-switch having a multi-switch fabric and the like. Thus, element 140 may more generally denote a network having its own connectivity fabric or network fabric where the network may include one or more components providing the connectivity between the host system 102 and data storage system 120.

The host system 102 may be implemented as a server, and may include an application 104, a multi-path (MP) driver 106 and other components 108 such as, for example, one or more other device drivers and other code. An IO request (specifying an IO operation) from the application 104 may be communicated to the data storage system 120 using the MP driver 106 and one or more other components 108. The application 104 may be a database or other application which issues data operations, such as IO operations, to the data storage system 120. Each of the IO operations may be directed to a target device, such as one of the LSUs of physical storage device 130, configured to be accessible to the host system 102 over multiple IO paths. As such, each of the IO operations may be forwarded from the application 104 to the data storage system 120 over one of the possible multiple IO paths.

The MP driver 106 may include functionality to perform any one or more different types of processing such as related to encryption, multi-pathing, mirroring, migration, and the like. For example, the MP driver 106 may include multi-pathing functionality for management and use of multiple IO paths. For example, the MP driver 106 may perform IO path selection to select one of the possible multiple IO paths based on one or more criteria such as load balancing to distribute IO requests for the target device across available active IO paths. Load balancing may be performed to provide for better resource utilization and increased performance of the host system, data storage system, and network or other connection infrastructure. The MP driver 106 may be included in a commercially available product such as, for example, Dell EMC PowerPath® software made available by Dell EMC. Other components 108 of the host system 102 may include one or more other layers of software used in connection with communicating the IO operation from the host system to the data storage system 120 such as, for example, Fibre Channel (FC) or SCSI drivers, a logical volume manager (LVM), or the like. The other components 108 may include software or other components used when sending an IO operation from the application 104 to the data storage system 120, where such components may include those invoked in a call stack above and/or below the MP driver 106. For example, application 104 may issue an IO operation which is communicated via a call stack including an LVM, the MP driver 106, and an FC or SCSI driver, e.g., as described elsewhere herein in more detail.

The data storage system 120 may include one or more physical storage devices, such as physical storage device 130, where each such physical storage device may be configured to store data of one or more LSUs. Each of the LSUs having data stored on the physical storage device 130 may be configured to be accessible to the host system 102 through one or more IO paths. For example, all LSUs of physical storage device 130 may be accessible using ports of the three FEs 122a-122c, also denoted respectively as host adapters HA1, HA2 and HA3. The multiple IO paths allow the application IOs to be routed over multiple IO paths and, more generally, allow the LSUs of physical storage device 130 to be accessed over multiple IO paths. In the event that there is a component failure in one of the multiple IO paths, IO requests from applications can be routed over other alternate IO paths unaffected by the component failure. The MP driver 106 may be configured to perform load balancing in connection with IO path selection, as well as other processing. The MP driver 106 may be aware of, and may monitor, all IO paths between the host system and the LSUs of the physical storage device 130 in order to determine which of the multiple IO paths are active or available at a point in time, which of the multiple IO paths are unavailable for communications, and to use such information to select an IO path for host system-data storage system communications.

In the example of the system 100, each of the LSUs of the physical storage device 130 may be configured to be accessible through three IO paths. Each IO path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an HA of the data storage system 120. In the example of the system 100, elements A1, A2 and A3 each denote a port of a host system 102 (e.g., a port of an HBA), and elements B1, B2 and B3 each denote a port of an HA of the data storage system 120. Each of the LSUs of the physical storage device 130 may be accessible over three IO paths—a first IO path represented by A1-B1, a second IO path represented by A2-B2 and a third IO path represented by A3-B3.

FIG. 6 is a block diagram illustrating an example of a plurality of logical layers 150 of a combination of a host system (e.g., the host system 102 of FIG. 3) and a data storage system (e.g., the data storage system 120) for processing an IO request, according to embodiments of the invention. Other embodiments of a plurality of logical layers of a combination of a host system and a data storage system for processing an IO request, for example, variations of logical layers 150, are possible and are intended to fall within the scope of the invention. FIG. 6 provides further detail regarding various software layers that may be used in connection with the MP driver 106 of FIG. 5. The various software layers of 150 may generally form layers included in the runtime IO stack, such as when an IO request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125a that maps the label or identifier specified by the application layer 121 to an LSU which the host system may perceive as corresponding to a physical storage device address (e.g., the address of one of the disk drives) within the storage system. Below the LVM layer 125a may be the MP (multi-path) driver 106 which handles processing of the IO received from layer 125a. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple IO path management and selecting one of a plurality of possible IO paths for use in connection with processing IO operations and communicating with the data storage system, such as data storage system 120 of FIG. 5. More generally, one or more layers between the application layer 121 and the MP driver 106, for example, the file system 123, may provide for mapping an LSU (such as used in connection with block-based storage), presented by the data storage system to the host system, to another logical data storage entity, such as a file, that may be used by the application layer 121. Below the MP driver 106 may be the SCSI driver 125b and a hardware (HW) driver 125c. The SCSI driver 125b may handle processing of a received IO request from the MP driver 106 such as related to forming a request in accordance with one or more SCSI standards. The driver 125c may be a hardware driver that facilitates communication with hardware on the host system. The driver 125c may be, for example, a driver for an HBA of the host system which sends commands or requests to the data storage system and also receives responses and other communications from the data storage system. It should be appreciated that, in some embodiments, the ordering of the MP driver 106 and SCSI driver 125b may be reversed. That is, in some cases, the MP driver 106 sits below the SCSI driver 126b.

In some embodiments, layers 121-125c are implemented on a host (e.g., the host system 102) coupled to a data storage system (e.g., the data storage system 120) that is an intelligent data storage system having its own mapping layer 127 such that the LSU known or exposed to the host system may not directly correspond to a physical storage device such as a disk drive. In such embodiments, the LSU specified by the host system in the IO operation may be further mapped by the data storage system using its mapping layer 127. For example, an LSU specified by the host system may be mapped by the data storage system to one or more physical drives, and multiple LSUs may be located on a same physical storage device, multiple physical drives, and the like.

The MP driver 106, as well as other components illustrated in FIG. 6, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more IO requests specifying IO operations (e.g., read and write operations) to logical volumes (implemented by the LVM 125*a*) or files (implemented using the file system 123), whereby such IO requests may be mapped to IO communications (specifying the IO operation) directed to LSUs of the data storage system. Such IO operations from the application layer 121 may be directed to the MP driver 106 after passing through any intervening layers such as, for example, the layers 123 and 125*a*. Communications between an initiator port of the host system and a target port of a data storage system (e.g., target port of an HA) may include those related to IO operations and other non-JO commands such as related to host system control operations. IO operations may include, for example, read and write operations with respect to data stored on an LSU.

In connection with the SCSI standard, an IO path may be defined between an initiator port of the host system and a target port of the data storage system. An IO request may be sent from the host system (e.g., from a component thereof such as an HBA), which may be referred to as an initiator, originator or source with respect to the foregoing IO path. The host system, as the initiator, sends IO requests along the IO path to a data storage system (e.g., a particular component thereof such as an HA having a port with a network address), which may be referred to as a target, destination, receiver, or responder. Each physical connection of an IO path may be between a first endpoint which is a port of the host system (e.g., such as an HBA having ports such as denoted as A1-A3 of FIG. 5) and a second endpoint which is a port of an HA (e.g., such as B1-B3 of FIG. 5) in the data storage system. Through each such IO path, one or more LSUs may be visible or exposed to the host system initiator through the target port of the data storage system.

Figure 7:
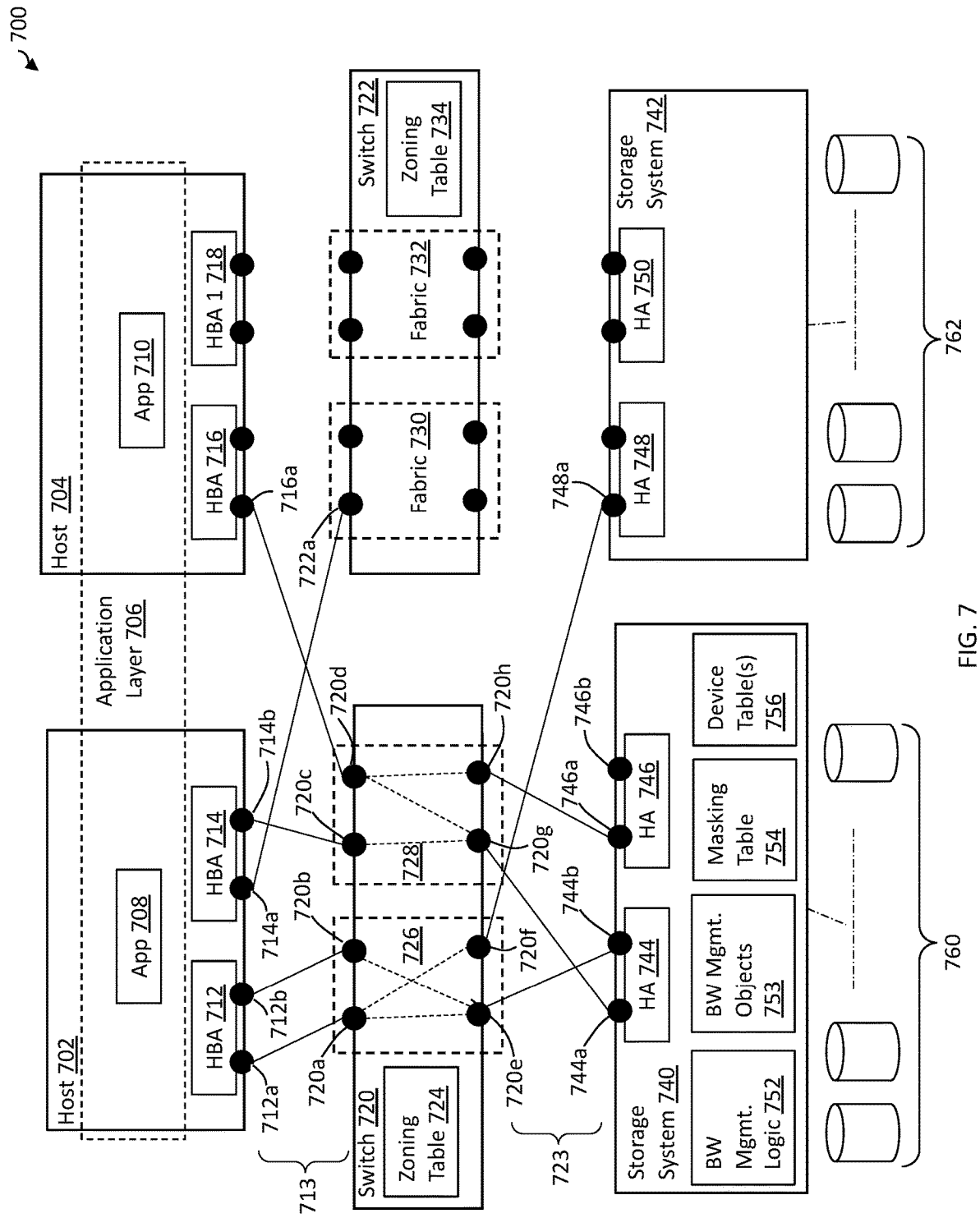
FIG. 7 is a block diagram illustrating an example of a storage network, according to embodiments of the invention.

FIG. 7 is a block diagram illustrating an example of a storage network 700, according to embodiments of the invention. Other embodiments of a storage network, for example, variations of storage network 700, are possible and are intended to fall within the scope of the invention. System 700 may include any of: hosts 702 and 704; switches 720 and 722; storage systems 740 and 742; physical storage devices 760 and 762; other components; or any suitable combination of the foregoing.

It should be appreciated that, while only two hosts are shown, system 700 may have significantly many more hosts, including tens, hundreds or even thousands more. Hosts 702 and 704 each may be physical host systems or virtual systems as part of a virtualized environment, and may be part of a host cluster and/or distributed across multiple physical devices and/or part of a cloud environment. Each of hosts 702 and 704 may be a host system 102 described in relation to FIG. 5 or include any of the components thereof described herein. Application layer 706 may represents the collective application layers of the software stacks of hosts 702 and 704, each of which may be an application layer 121 as described in relation to FIG. 6.

Host 702 may include any of: a portion of the application layer at 706; application 708; HBAs 712 and 714; and host ports 712*a*, 712*b*, 714*a* and 714*b*. The portion of application layer 706 running on host 702 may include application 708 and one or more other applications. HBA 712 may include host ports 712*a* and 712*b*, and HBA 714 may include host ports 714*a* and 714*b*. HBAs 712 and 714 each may be separate discrete logical or physical components of host 702, and host 702 may include more than the two HBAs illustrated. Each of the host ports 712*a*, 712*b*, 714*a* and 714*b* may be connected to a switch port of switch 720 or 722 (referred to herein as a switch host port (SHP) or fabric port) by physical connections 713, which may be referred to herein as "host port links." Each such physical connection may be a cable and, in some embodiments, there is only enabled one physical connection between each host port and fabric port (e.g., in accordance with a technology standard (e.g., FC)) as illustrated in FIG. 7. That is, in some embodiments, each fabric port is dedicated to one host port. FIG. 7 illustrates host ports 712*a*, 712*b*, 714*a*, 714*b* and 716*a* connected to fabric ports over physical connections 713 in which there is only one physical connection 713 between each host port and each fabric port.

Host 704 may include any of: a portion of the application layer at 706; application 710; HBAs 716 and 718; and multiple host ports including host port 716*a* of HBA 716.

Switch 720 may include any of: zoning table 724, fabrics 726 and 728; ports 720*a-h*; other components; or any suitable combination of the foregoing. Each of ports 720*a-h* ports configured to be connected (e.g., by a cable) to ports on a storage system (e.g., on a front-end of a storage system as part of a host adapter). Such switch ports may be referred to herein as switch storage ports ("SSPs") and the front-end ports of the storage system to which they connect referred to herein as front-end ports ("FEPs"). SSP may be connected to an FEP by physical connections 723, which may be referred to herein as "FEP links." Each such physical connection may be a cable and, in some embodiments, there is only enabled one physical connection between each SSP and FEP (e.g., in accordance with a technology standard (e.g., FC)) as illustrated in FIG. 7. That is, in some embodiments, each SSP is dedicated to an FEP. FIG. 7 illustrates FEPs 744*a*, 744*b* and 746*a* connected to SSPs 720*g*, 720*a* and 720*h*, respectively, over physical connections 723 in which there is only one physical connection 723 between each FEP and each SSP.

The zoning table 724 may be a data structure that defines which host ports (as defined by a unique identifier such as a WWN), e.g., corresponding to host ports 712*a*, 712*b*, 714*a*, 714*b* and 716*a*, are enabled to communicate with which FEPs, for example, 744*a*, 744*b*, 746*a*, 746*b* and 748*a*. Zoning tables are described in more detail elsewhere herein. The switch 720 may use the information in the zoning table 724 to determine the internal switch connections between fabric ports and SSPs to implement the defined zones, as illustrated by the dashed lines within switch 720 in FIG. 7. Zoning table 724 or another data structure on switch 720 may define one or more fabrics, including fabrics 726 and 728, for example, by specifying the switch ports that are members of the fabrics.

A fabric is a logical entity that includes one or more SHPs and one or more SSPs as its members, for which IO connectivity associated with the fabric are only permitted between the member SHPs and SSPs, and not with any SHP or SSP that is not a member of the fabric. A fabric may include SHPs and/or SSPs from different switches, or may include only SHPs and/or SSPs of a single switch, for example, all of the SHPs and/or SSPs of a switch or a subset thereof. A fabric may be considered to define a virtual SAN (i.e., "VSAN"), and the term VSAN is sometimes used interchangeably with the term "fabric." Each fabric may have a unique identifier referred to herein as a "fabric name," which may be synonymous with a VSAN name. For example, a data structure on switch 720 or elsewhere may define that fabric 726 includes ports 720a, 720b, 720e and 720f.

The switch 722 may include any of: zoning table 734; fabrics 730 and 732; several ports including port 722a; other components; or any suitable combination of the foregoing. Each of switches 720 and 722 may be a switch 140 described in relation to FIG. 5 or include any of the components thereof described herein. In some embodiments, one or both of switches 720 and 722 may be a Dell EMC Connectrix™ switch or director made available by Dell EMC.

The storage system 740 may include any of: bandwidth (BW) logic 752; bandwidth (BW) management objects 753; masking table 754; device table(s) 756; HAs 744 and 746; FEPs 744a, 744b, 746a and 746b; other components; and any suitable combination of the foregoing. Device table(s) 756 may define properties of LSUs of the storage system 740, including logical devices (which may include thin devices) corresponding to physical storage devices 760, as described in more detail elsewhere herein. Masking table 754 may define which host ports (e.g., 712a, 712b, 714a, 714b, 716a) are permitted to communicate with which LSUs over which FEPs (e.g., 744a, 744b 746a, 746b). Masking tables are described in more detail elsewhere herein.

The BW management logic 752 may be configured with logic (software, hardware, firmware or a combination thereof) to perform one or processes in accordance with managing bandwidth on a storage network, for example, one or more of the methods described herein, or sub-steps thereof, including methods 1100, 1200 or 1300. The BW management logic 752 may be configured to use the BW management objects 753 to manage bandwidth for IO connections on a storage network. The BW management objects 753 may include one or more objects (e.g., data structures) for managing bandwidth for IO connections on a storage network including, for example, any of data structures 800, 900 or 1000, described in more detail elsewhere herein. The BW management logic 752 or components thereof may be implemented as part of one or more FAs 21a-n and/or management module 22 described in relation to FIG. 1.

The storage system 742 may include any of the same or similar components as storage system 740, including HA 748 and FEP 748a thereof. In some embodiments, storage systems 740 and/or 742 may be a storage system 20a and/or 120 described in relation to FIGS. 1 and 5, respectively, or include one more components and/or functionality thereof.

Storage systems (e.g., the storage systems 740 and/or 742) may maintain data structures (e.g., masking tables) that define IO connectivity in terms of LSUs, FEPs and host ports; i.e., which ports of a host system ("host ports"; e.g., SCSI initiators) are permitted to perform IO communications with which LSUs (e.g., identified with, and sometimes referred to as, a Logical Unit Numbers (LUNs)) over which FEPs (e.g., SCSI targets). Defining (including initially defining and later modifying) which host ports are permitted to perform IO communications with which LSUs over which FEPs, for example, using a masking table or other data structure, may be referred to as configuring or defining IO connectivity between a host port, FEP and LSU, or more simply as "masking."

Figures 8, 9, 10, 11:
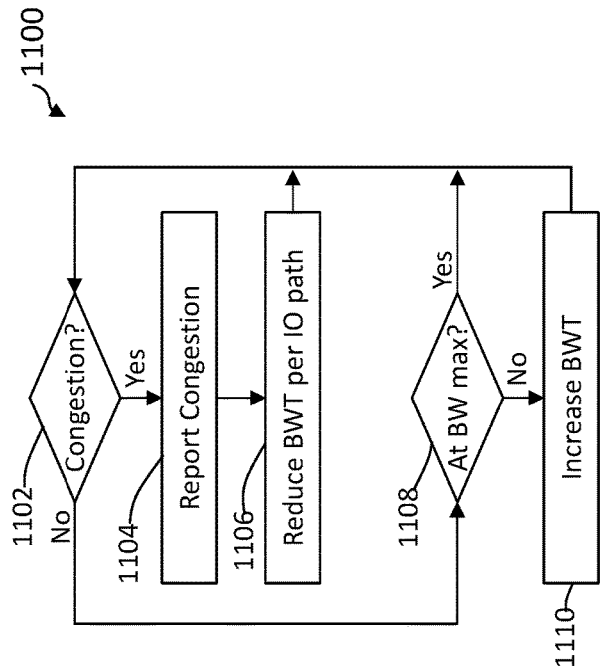
FIG. 8 is a block diagram illustrating an example of a data structure defining port connectivity permissions between a storage system and one or more host systems, according to embodiments of the invention.
FIG. 9 is a block diagram illustrating an example of a data structure defining port connectivity permissions for a switch, according to embodiments of the invention.
FIG. 10 is a block diagram illustrating an example of a data structure for maintaining bandwidth thresholds for IO paths, according to embodiments of the invention.
FIG. 11 is a flowchart illustrating an example of a method of managing congestion on a front-end port link, according to embodiments of the invention.

FIG. 8 is a block diagram illustrating an example of a data structure 800 defining port connectivity permissions between a storage system and one or more host systems, according to embodiments of the invention. Other embodiments of a data structure defining port connectivity permissions between a storage system and one or more host systems, for example, variations of data structure 800, are possible and are intended to fall within the scope of the invention. In some embodiments, data structure 800 may be a masking table.

The data structure 800 may include a plurality of entries 810, each entry representing an LSU (e.g., logical device) identified in column 802 and specifying a host port (e.g., by World Wide Name (WWN)) in column 804 with which the identified LSU is enabled to communicate IO over the FEP identified in column 806. Other information, for example, the host and/or the HBA associated with the host port and/or the FA associated with the FEP may be specified in column 808. A data structure other than a table, for example, a linked list and/or object-oriented data structure, may be used to record the same information.

To properly configure IO connectivity between host ports, FEPs and LSUs, it may be necessary to know the permissible IO paths between host ports and FEPs (e.g., across a switch fabric), which may be defined by zoning tables on one or more switches of a switch fabric. Switches may include zoning tables that define the logical connections between SHPs and SSPs of the switch; e.g., by specifying pairs of host port IDs (e.g., WWNs) and FEP IDs (WWNs), each identified host port corresponding to a directly connected (e.g., by an FC cable) SHP of the switch and each identified FEP corresponding to a directly connected SSP of the switch. Thus, the zoning table of a switch defines permissible IO paths between a host system and a storage system over the switch, each IO path defined by (and including) a host port and an FEP. Such IO paths may be referred to herein as "zoned IO paths" or "enabled IO paths," and the process of defining (including initially defining and later modifying) enabled IO paths in a zoning table, or the resulting enabled IO paths collectively, may referred to herein as "zoning."

FIG. 9 is a block diagram illustrating an example of a data structure 900 defining port connectivity permissions for a switch, according to embodiments of the invention. Other embodiments of a data structure defining port connectivity permissions for a switch, for example, variations of data structure 900, are possible and are intended to fall within the scope of the invention. The data structure 900 may be a zoning table, and may include a plurality of entries 910, each entry representing an initiator port (e.g., a host port) in column 902 and a target port (e.g., an FEP) in column 904 with which the initiator port may communicate over a fabric. Other information, for example, host, HBA, HA, fabric name, etc. may be specified in column 906. A data structure other than a table, for example, a linked list and/or object-oriented data structure, may be used to record the same information.

After a switch has been zoned during an initial configuration of a network, and perhaps later if a switch is rezoned, host ports may log into FEPs. A host port logging into an FEP may include the host port and FEP exchanging unique identifiers (e.g., WWNs) and other information, for example, in accordance with an FC protocol. The log-in process also may include the host port inquiring to the FEP about any LSUs available through the FEP, for example, by issuing a REPORT LUNS command in accordance with a SCSI protocol. The FEP may respond with a list of LSUs available to the host port through the FEP, for example, by providing a list of LSU identifiers (e.g., LUNs), after which host registration may be performed. Host registration may include the host port providing host information to the FEP, including, for example: a host operating system (OS), OS level, host vendor and model, vendor unique (VU) commands used by the host, virtual machines (VMs) running on the host, and/or other host information.

During the login of a host port to an FEP, a log-in table may be updated. Each entry of the log-in table may represent and specify a host port and an FEP into which the host port logged. For ease of reference, this host port-FEP combination of each entry may be referred to herein as an I-T (initiator-target) pair, even though the invention is not limited to SCSI technology. Each log-in table entry may specify an I-T pair and other information pertaining to the I-T pair.

In some embodiments, one or more of the data structures 62, 72, 72', 82, 800 and 900 may be augmented with information for managing bandwidth in connection with FEPs as described herein. In other embodiments, separate data structures may be provided for managing bandwidth in relation to FEPs of a storage system, for example, bandwidth management objects 753, which may include data structure 1000 described in more detail elsewhere herein. It should be appreciated that one or more of the data structures 62, 72, 72', 82, 800, 900 and 1000, or information contained therein, may be combined in one or more data structures, either as a variation of the one of the foregoing data structures or in a different data structure altogether.

FIG. 10 is a block diagram illustrating an example of a data structure 1000 for maintaining BWTs for IO paths corresponding to an FEP, according to embodiments of the invention. Other embodiments of a data structure for maintaining host port BWTs corresponding to an FEP, for example, variations of the data structure 1000, are possible and are intended to fall within the scope of the invention. Data structure 1000 may be referred to herein as a BWT table.

The BWT table 1000 may include a plurality of entries 1010, each entry representing a IO path corresponding to an FEP. Each entry may include a host port ID (e.g., WWN) in host port ID column 1002, where the combination of the FEP (specific to the BWT table) and the host specified by the host port ID of the entry define an IO path. Each entry also may specify a default BWT for the IO path (e.g., in units of Gigabits per second) in the IO Path BWT column 1004; a current BWT of the IO path in current BWT column 1006; and other information.

It should be appreciated that, in some embodiments, rather than having a separate BWT table 1000 for each FEP of a storage system, a BWT table may be configured to represent a plurality (e.g., all) FEPs on a storage system, where each entry 1010 also specifies an FEP ID (e.g., WWN) in an FEP ID column (not shown), such that the FEP ID and host port ID specified in each entry defines the IO path represented by the entry. BWT table 1000 and/or variations thereof may be used to manage bandwidth consumption and congestion on IO paths, as described in more detail elsewhere herein.

FIG. 11 is a flowchart illustrating an example of a method 1100 of managing congestion on an FEP link, according to embodiments of the invention. Other embodiments of a method 1100 of managing congestion on an FEP link, for example, variations of the method 1100, are possible and are intended to fall within the scope of the invention. It should be appreciated that, while some steps of the method 1100 are described in relation to a single FEP, the method 1100 may be performed for multiple FEPs, serially and/or concurrently. The method 1100, and methods 1200 and 1300 described elsewhere herein, may be implemented by bandwidth management logic 752.

In a step 1102, it may be determined whether there is congestion on an FEP link (e.g., 723) of a storage system (e.g., 740), for example, by monitoring communications from a switch (e.g., 720 or 722). For example, the storage system (e.g., an FA thereof) may be configured to check at scheduled times (e.g., periodically) for communications received from a switch, including, e.g., FPINs, and/or to receive communications (e.g., FPINs) asynchronously from the switch, and determine if any such switch communications specify that there is congestion on any FEPs of the storage system.

If it is determined in the step 1102 that there is congestion on an FEP of the storage system, then the congestion may be reported, for example, via IO communications, email, texting and/or other communication means, to a system administrator or other entity in a step 1104. Further, the congestion determination may be recorded, for example, in one or more metadata structures on the storage system or elsewhere, e.g., in one or more of the data structures described herein.

In a step 1106, for the FEP link for which congestion was determined in the step 1104, the BWT for one or more (e.g., all) IO paths that include the FEP may be reduced, for example, by a set amount or by a percentage of the current BWT. For example, the BWT for each such IO path may be reduced by 20%, 25%, 30%, etc. of the current BWT for the IO path. For example, an IO path BWT may have been initially set when the host port of the IO path logged-in and/or registered with the FEP of the IO path or at a later time, and later may have been changed. The BWT of an IO path may have been manually or automatically set to: the FEP BWT; the lowest of any link along the IO path (including, e.g., the FEP BWT and the host port BWT); or another value based on any of a variety of factors. As used herein, a value of an IO path BWT, absent any of the BWT decreases or increases as a result of congestion or faultiness described herein, may be referred to as the "default BWT." As an example, at the time of performance of the step 1106, if the current BWT of the IO path is a default BWT of 16 Gbps, the IO path BWT may be reduced by 25% to 12 Gbps in response to determining that there is congestion on the FEP link. The IO paths that include the FEP, for which the step 1106 may be performed, may be determined from one or more data structures, for example, the BWT table 1000 and/or the masking table 800.

After reducing the BWT thresholds of one or more IO paths in the step 1106, switch communications may continue to be monitored, which is illustrated in FIG. 11 by a return of method 1100 to the step 1102. If it is determined again that there is congestion on a same FEP link; i.e., if a next switch communication and/or a switch communication accessed at a next schedule time indicates that there is congestion on the FEP link, the BWTs of the one or more IO paths that include the FEP may be further reduced, by a same or different set amount or percentage as a previous time the BWTs were reduced. For example, in some embodiments, a counter may be maintained regarding how many consecutive times the BWT of an IO path has been reduced (i.e., how many times the BWT has been reduced without any intervening increase, and the extent (e.g., percentage or set amount) the BWT is reduced may depend on the value of the counter. For example, the first time the BWT is decreased, it may be decreased by 30%, the second time by 25%, the third time by 15%, etc. It should be appreciated that iterative performances of the step 1102 may result in the BWT of one or more IO paths being reduced until the result of the test of the step 1102 is negative; e.g., until there is no longer any congestion reported by the switch, for example, in an FPIN—at least temporarily.

For each of one or more FEPs on the storage system, it may be determined in the step 1102 that there currently is not congestion on the FEP link. For example, it may be determined: that there has been no switch communications indicating congestion on the FEP link for a predetermined amount of time, and/or that, at a last scheduled time at which switch communications were checked, there was no indication of congestion. In response to determining that there is no congestion (currently) on the FEP link, it may be determined in a step 1108 whether, for each IO path including the FEP, the IO path BWT is already at a maximum potential value of the BWT, for example, the default BWT for the IO path. If the IO path BWT is already at the maximum value, it may mean that the IO path is not currently in a reduced BWT state because of recent congestion on the FEP link, so there is no need to increase the IO path BWT to compensate for a previous reduction of the BWT. Under such a condition, for each such IO path, the method 1100 may return to monitoring switch communications without increasing the host port BWT. Otherwise, for each such IO path, if the IO path BWT is not at a maximum value (e.g., the default BWT), the IO path BWT may be increased in a step 1110.

After increasing one or more IO path BWTs in the step 1110, switch communications may continue to be monitored, which is illustrated in FIG. 11 by a return of method 1100 to the step 1102. If it is determined again that there is not congestion on the FEP link—e.g., no switch communication indicating congestion on the FEP link is received by a next scheduled time—the step 1108 may be performed again. For each IO path including the FEP port, if the maximum BWT value has not yet been reached, the IO path BWT may be further increased, by a same or different set amount or percentage as a previous time the BWT was increased. For example, in some embodiments, a counter may be maintained regarding how many consecutive times the IO path BWT has been increased without any intervening decrease of the IO path BWT, and the extent (e.g., percentage or set amount) the host port BWT is increased may depend on the value of the counter.

It should be appreciated that iterative execution of the method 1100 may result in alternating between decreasing and increasing a BWT of one or more IO paths for one or more FEPs, which may include consecutive instances of one before an instance of the other. For example, for a given IO path of an FEP, ten passes through method 1100 may result in the following (in temporal order): two BWT decreases, one BWT increase, two BWT decreases, three BWT increases, one BWT decrease and one BWT increase. Any of a variety of sequences are possible.

For each IO path of an FEP, at any point in time concurrent to the performance of the method 1100 and/or performance of the methods 1200 or 1300 described in more detail elsewhere herein, bandwidth consumption by one or more LSUs permitted to exchange IO communications on the IO path (e.g., as defined in the masking table 800) may be managed up to a bandwidth limit specified by the current IO path BWT.

Figure 12:
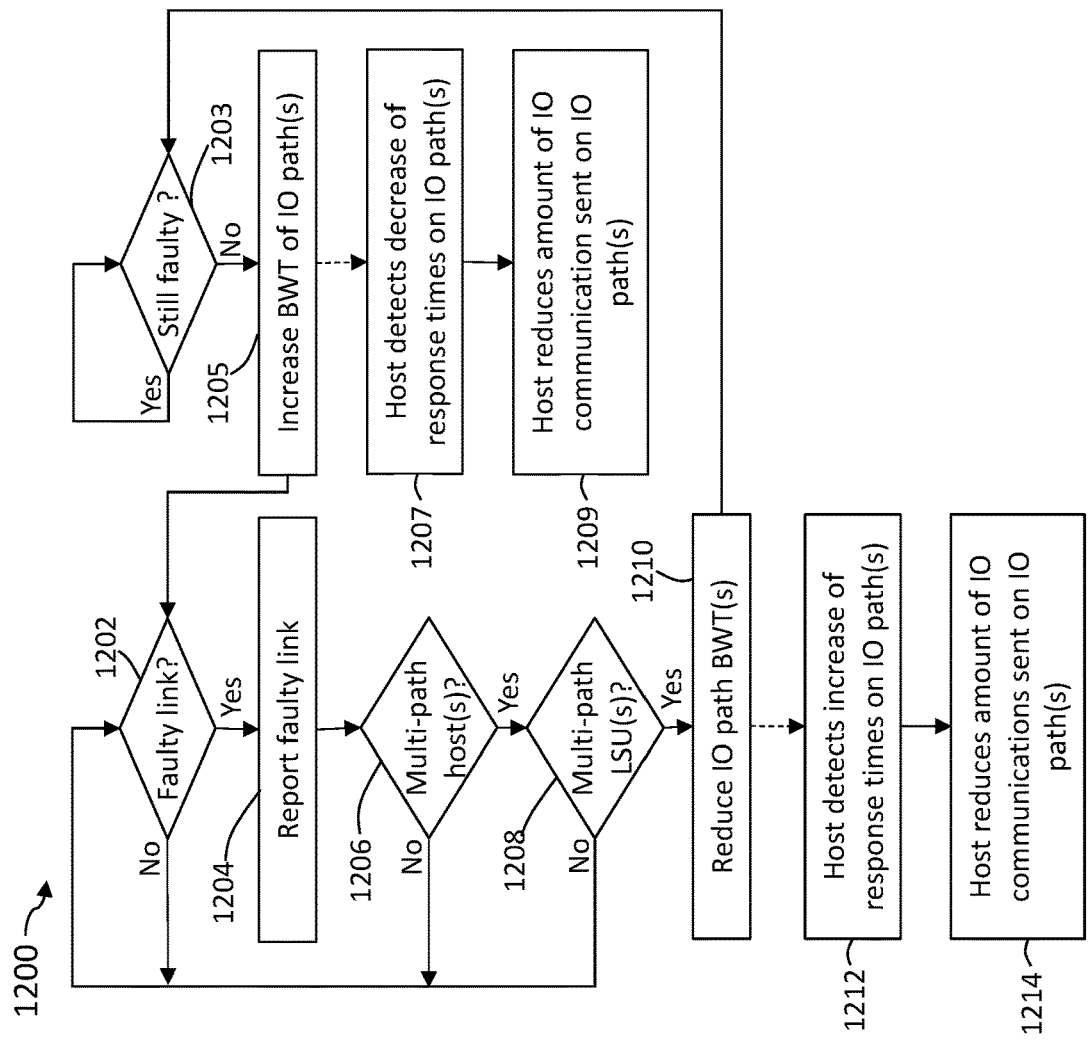
FIG. 12 is a flowchart illustrating an example of a method of managing a faulty front-end port link, according to embodiments of the invention.

As noted elsewhere herein, in addition to managing bandwidth in response to congestion on an FEP link, bandwidth may be managed in response to faultiness on an FEP link. FIG. 12 is a flowchart illustrating an example of a method 1200 of managing bandwidth for a faulty FEP link, according to embodiments of the invention. Other embodiments of a method of managing a faulty FEP link, for example, variations of the method 1200, are possible and are intended to fall within the scope of the invention.

In a step 1202, it may be determined whether there is a faulty FEP link (e.g., 723) of a storage system (e.g., 740), for example, by monitoring communications from a switch (e.g., 720 or 722). For example, the storage system (e.g., an FA thereof) may be configured to check at scheduled times (e.g., periodically) for communications received from a switch, including, e.g., FPINs, and/or to receive communications (e.g., FPINs) asynchronously from the switch, and determine if any such switch communications specify that any of the FEPs of the storage system are faulty.

If it is determined in the step 1202 that there is a faulty FEP on the storage system, then the faulty link may be reported, for example, via IO communications, email, texting and/or other communication means, to a system administrator or other entity in a step 1204. Further, the faulty-link determination may be recorded, for example, in one or more metadata structures on the storage system or elsewhere, e.g., in one or more of the data structures described herein.

In a step 1206, it may be determined, for each host having a host port on an IO path for any faulty port determined in the step 1202, whether the host supports multi-pathing, for example, whether the host has an MP driver configured to select from among multiple IO paths available for an LSU (and corresponding application executing on the host). For any such IO paths for which it is determined that the host supports multipathing, the method 1200 may proceed to the step 1208, in which it may be determined whether, for such IO path, whether one or more (e.g., all) LSUs permitted to exchange IO communications on the data path are multi-pathed—i.e., have another IO path that is permitted to be used by the LSU. The IO paths that include the faulty FEP link, for which the steps 1206 and/or 1208 may be performed, may be determined from one or more data structures, for example, the BWT table 1000 and/or the masking table 800. Further, the LSUs permitted to exchange IO communications over such IO paths, and whether there are multiple IO paths defined for each such LSU, may be determined by accessing and analyzing information from the masking table 800 and/or other data structures, for example, other data structures defined herein and/or indexes derived from the masking table 800 and/or or other data structures. It should be appreciated that the steps 1206 and 1208, or parts thereof, may be performed concurrently or in a different order than illustrated in FIG. 12.

For each IO path of the faulty FEP link for which it is determined in the step 1208 that one or more (e.g., all) of the LSUs permitted to exchange IO communications on the IO path are multi-pathed, the BWT for each such IO path may be reduced in a step 1210, for example, by a set amount or by a percentage of the current BWT. For example, the BWT for each such IO path may be reduced by 20%, 35%, 40%, etc. of the current BWT for the IO path. For each such IO path, as a result of the reduced bandwidth, the host (e.g., 702 or 704) corresponding to the IO path may detect an increase in response times for IO communications on the IO path in a step 1212, and accordingly reduce an amount of IO communications sent on the IO path in a step 1214. For example, an MP driver (e.g., 106) of the host may be configured such that, as a result of detecting increased response times on such IO paths, it selects an alternative permitted IO path for IO communications of the LSU (and corresponding application) in question.

After reducing the BWT thresholds of one or more IO paths in the step 1210, and concurrently to the processing of IO communications described in relation to steps 1212 and 1214, switch communications may continue to be monitored. For example, for an FEP link determined to be faulty in the step 1202, it may be determined in the step 1203 whether the FEP link is still faulty. If still faulty, no changes may be made to any IO path BWTs and switch communications may continue to be monitored to determine if the FEP link in question is still faulty. However, if it is determined that such an FEP link in no longer faulty—e.g., that there has been no switch communications indicating that the FEP link is faulty for a predetermined amount of time, and/or that, at a last scheduled time at which switch communications were checked, there was no indication that the FEP link is faulty—the IO path BWT may be increased in a step 1205, for example, returned to its default BWT.

For each IO path having its BWT increased in the step 1205, as a result of the increased bandwidth, the host corresponding to the IO path may detect a decrease in response times for IO communications on the IO path in a step 1207, and accordingly increase an amount of IO communications sent on the IO path in a step 1209. For example, an MP driver of the host may be configured such that, as a result of detecting decreased response times on such IO paths, it selects the IO path over other alternative permitted IO paths for IO communications of the LSU (and corresponding application) in question.

It should be appreciated that iterative execution of the method 1200 may result in alternating between decreasing and increasing a BWT of one or more IO paths for one or more FEPs, which may include consecutive instances of one before an instance of the other, for example, as described in more detail herein in relation to managing bandwidth when congestion is detected.

Figure 13:
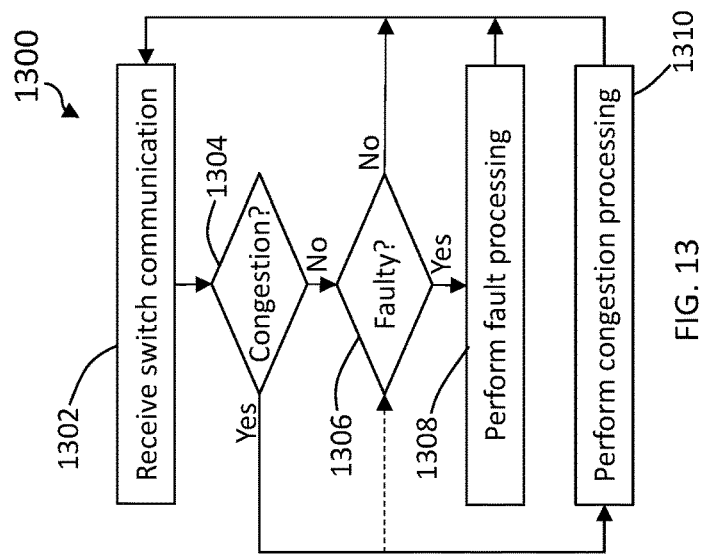
FIG. 13 is a flowchart illustrating an example of a method of managing bandwidth consumption on a front-end port link, according to embodiments of the invention.

In some embodiments of the inventions, the methods 1100 and 1200 are performed concurrently and/or as part of a same process, for example, as part of a method 1300 illustrated in relation to FIG. 13. FIG. 13 is a flowchart illustrating an example of a method 1300 of managing bandwidth consumption on an FEP link, according to embodiments of the invention. Other embodiments of a method of managing bandwidth consumption on an FEP link, for example, variations of the method 1300, are possible and are intended to fall within the scope of the invention.

In a step 1302, communications may be received from a switch (e.g., at scheduled times (e.g., periodically) or asynchronously), for example, specifying a state of one or more FEP links and/or a characteristic thereof including, for example, whether the FEP link is exhibiting congestion or is faulty. In step 1304, it may be determined whether there is congestion on one or more FEPs based on the switch communications received in the step 1302, and if so congestion processing may be performed, for example, in accordance with method 1100, and switch communication may continue to be monitored and received in the step 1302.

If it is determined in step 1304 that there is not congestion on one or more FEP ports, or is some embodiments, even if congestion is determined for one or more FEP links, it may be determined in a step 1306 whether there are one or more faulty FEPs based on the switch communications received in the step 1302. If there are or more faulty FEPs, fault processing may be performed, for example, in accordance with method 1200, and switch communication may continue to be monitored and received in the step 1302. It should be appreciated that the steps 1304 and 1306 may be performed concurrently or in a different order than illustrated in FIG. 13, and similarly steps 1308 and 1310 may be performed concurrently or in a different order than illustrated in FIG. 13.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 1100, 1200 and 1300, or parts thereof, may be implemented using one or more of the systems and/or data structures described in relation to FIGS. 1-10 or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a system including a storage system coupled to a host by a switch, wherein a plurality of IO paths are defined between the host and the storage system across the switch, each IO path having a defined bandwidth threshold, a method comprising:
 a first host port of the host logging into a first storage system port of the storage system, wherein the first host port and the first storage system port denote a first IO path that includes the first storage system port, wherein the first IO path includes a physical link between a first switch port of the switch and the first storage system port of the storage system;
in response to said first host port logging into the first storage system port, setting a first defined bandwidth threshold for the first IO path; and
the storage system monitoring communications received at the storage system from the switch, wherein said monitoring performed by the storage system includes:
receiving a first notification at the storage system from the switch, wherein the first notification is generated by, and originates from, the switch and indicates there is congestion on the physical link between the first switch port of the switch and the first storage system port of the storage system, wherein the storage system receiving the first notification from the switch exposes one or more logical devices of the storage system to the host over the first IO path including the physical link, wherein each of the logical devices is provisioned from non-volatile physical storage of one or more physical storage devices of the storage system;
responsive to the storage system receiving the first notification that is generated by and originates from the switch, determining, by the storage system, that there is congestion on the physical link between the first switch port of the switch and the first storage system port of the storage system;
in response to said determining by the storage system that there is congestion on the physical link, the storage system reducing the defined bandwidth threshold for each of the plurality of IO paths that includes the first storage system port, wherein the plurality of IO paths include the first IO path and wherein said reducing includes the storage system reducing the first defined bandwidth threshold for the first IO path that includes the first storage system port;
receiving a notification at the storage system from the switch indicating that the physical link is faulty, wherein the notification regarding the physical link being faulty is generated by, and originates from, the switch; and
responsive to receiving the notification indicating that the physical link is faulty, performing fault processing by the storage system, wherein a logical device of the plurality of logical devices is exposed by the storage system to the host over the first IO path which includes the first storage system port and which includes the physical link that is faulty, and wherein said fault processing includes:
determining whether the logical device, which is exposed to the host over the first storage system port of the physical link that is faulty, is exposed to the host by the storage system over a first plurality of paths including the first IO path and at least one additional IO path between the host and the storage system;
determining whether the host supports multi-path processing and includes a multi-path driver that, for each I/O directed to the logical device exposed to the host over the first plurality of paths, selects a particular one of the first plurality of paths to be used for sending said each I/O from the host to the storage system;

responsive to determining that the host does not support multi-path processing and does not include the multi-path driver, determining not the reduce the first defined bandwidth threshold for the first IO path; and
responsive to determining that the logical device is not exposed to the host over the first plurality of paths including the first IO path with the physical link that is faulty at least one additional IO path between the host and the storage system, determining not to reduce the first defined bandwidth threshold for the first IO path.

2. The method of claim 1, further comprising:
after receiving the first notification at the storage system from the switch, receiving a second notification from the switch indicating that there is congestion on the physical link, wherein the second notification is generated by, and originates from, the switch; and
for each of the plurality of IO paths that includes the first storage system port, further reducing the defined bandwidth threshold for said each IO path in response to receiving the second notification.

3. The method of claim 1, further comprising:
after receiving the first notification at the storage system from the switch, determining that there has not been received in a predefined amount of time another notification from the switch indicating that there is congestion on the physical link; and
for each of the plurality of IO paths that includes the first storage system port, increasing the defined bandwidth threshold for said each IO path in response to the determination that the another notification has not been received in the predefined amount of time, wherein the another notification is generated by, and originates from, the switch.

4. The method of claim 1, wherein said reducing the defined bandwidth threshold for each of the plurality of IO paths increases response times for IO operations on the plurality of IO paths, and the method further comprising:
the host detecting the increased response times on the plurality of IO paths; and
the host reducing an amount of IO communication sent to the plurality of IO paths in response to detecting the increased response times.

5. A storage system coupled to a host by a switch, wherein a plurality of IO paths are defined between the host and the storage system across the switch, each IO path having a defined bandwidth threshold, the storage system comprising executable logic that implements a method including:
a first host port of the host logging into a first storage system port of the storage system, wherein the first host port and the first storage system port denote a first IO path that includes the first storage system port, wherein the first IO path includes a physical link between a first switch port of the switch and the first storage system port of the storage system;
in response to said first host port logging into the first storage system port, setting a first defined bandwidth threshold for the first IO path; and
the storage system monitoring communications received at the storage system from the switch, wherein said monitoring performed by the storage system includes:
receiving a first notification at the storage system from the switch, wherein the first notification is generated by, and originates from, the switch and indicates there is congestion on the physical link between the first switch port of the switch and the first storage system port of the storage system, wherein the storage system receiving the first notification from the switch exposes one or more logical devices of the storage system to the host over the first IO path including the physical link, wherein each of the logical devices is provisioned from non-volatile physical storage of one or more physical storage devices of the storage system;

responsive to the storage system receiving the first notification that is generated by and originates from the switch, determining, by the storage system, that there is congestion on the physical link between the first switch port of the switch and the first storage system port of the storage system;

in response to said determining by the storage system that there is congestion on the physical link, the storage system reducing the defined bandwidth threshold for each of the plurality of IO paths that includes the first storage system port, wherein the plurality of IO paths include the first IO path and wherein said reducing includes the storage system reducing the first defined bandwidth threshold for the first IO path that includes the first storage system port;

receiving a notification at the storage system from the switch indicating that the physical link is faulty, wherein the notification regarding the physical link being faulty is generated by, and originates from, the switch; and responsive to receiving the notification indicating that the physical link is faulty, performing fault processing by the storage system, wherein a logical device of the plurality of logical devices is exposed by the storage system to the host over the first IO path which includes the first storage system port and which includes the physical link that is faulty, and wherein said fault processing includes:

determining whether the logical device, which is exposed to the host over the first storage system port of the physical link that is faulty, is exposed to the host by the storage system over a first plurality of paths including the first IO path and at least one additional IO path between the host and the storage system;

determining whether the host supports multi-path processing and includes a multi-path driver that, for each I/O directed to the logical device exposed to the host over the first plurality of paths, selects a particular one of the first plurality of paths to be used for sending said each I/O from the host to the storage system;

responsive to determining that the host does not support multi-path processing and does not include the multi-path driver, determining not the reduce the first defined bandwidth threshold for the first IO path; and responsive to determining that the logical device is not exposed to the host over the first plurality of paths including the first IO path with the physical link that is faulty at least one additional IO path between the host and the storage system, determining not to reduce the first defined bandwidth threshold for the first IO path.

6. The storage system of claim 5, wherein the method further comprises:

after receiving the first notification at the storage system from the switch, receiving a second notification from the switch indicating that there is congestion on the physical link, wherein the second notification is generated by, and originates from, the switch; and for each of the plurality of IO paths that includes the first storage system port, increasing the defined bandwidth threshold for said each IO path in response to the determination that another notification has not been received in the predefined amount of time, wherein the another notification is generated by, and originates from, the switch.

7. The storage system of claim 5, wherein the method further comprises:

after receiving the first notification at the storage system from the switch, determining that there has not been received in a predefined amount of time another notification from the switch indicating that there is congestion on the physical link; and for each of the plurality of IO paths that includes the first storage system port, increasing the defined bandwidth threshold for said each IO path in response to the determination that the another notification has not been received in the predefined amount of time, wherein the another notification is generated by, and originates from, the switch.

8. The storage system of claim 5, wherein said reducing the defined bandwidth threshold for each of the plurality of IO paths increases response times for IO operations on the plurality of IO paths, the method further comprising:

the host detecting the increased response times on the plurality of IO paths; and the host reducing an amount of IO communication sent to the plurality of IO paths in response to detecting the increased response times.

9. For a system including a storage system coupled to a host by a switch, wherein a plurality of IO paths are defined between the host and the storage system across the switch, each IO path having a defined bandwidth threshold, non-transitory computer-readable media having software stored thereon comprising:

executable code that, for a first host port of the host, logs into a first storage system port of the storage system, wherein the first host port and the first storage system port denote a first IO path that includes the first storage system port, wherein the first IO path includes a physical link between a first switch port of the switch and the first storage system port of the storage system;

executable code that, in response to said first host port logging into the first storage system port, sets a first defined bandwidth threshold for the first IO path; and executable code that causes the storage system to perform monitoring of communications received at the storage system from the switch, wherein said executable code that causes the storage system to perform said monitoring includes:

executable code that receives a first notification at the storage system from the switch, wherein the first notification is generated by, and originates from, the switch and indicates there is congestion on the physical link between the first switch port of the switch and the first storage system port of the storage system, wherein the storage system exposes one of more logical devices of the storage system to the host over the first IO path including the physical link, wherein each of the logical devices is provisioned from non-volatile storage of one or more physical storage devices of the storage system;

executable code that, responsive to the storage system receiving the first notification that is generated by and originates from the switch, causes the storage system to determine that there is congestion on the physical link between the first switch port of the switch and the first storage system port of the storage system;

executable code that, in response to the storage system determining that there is congestion on the physical link, causes the storage system to reduce the defined bandwidth threshold for each of the plurality of IO paths that includes the first storage system port, wherein the plurality of IO paths include the first IO path and wherein the executable code that causes the storage system to reduce the defined bandwidth threshold for each of one or more of the plurality of IO paths includes the storage system reducing the first defined bandwidth threshold for the first IO path that includes the first storage system port;

executable code that receives a notification at the storage system from the switch indicating that the physical link is faulty, wherein the notification regarding the physical link being faulty is generated by, and originates from, the switch; and executable code that, responsive to receiving the notification indicating that the physical link is faulty, performs fault processing on the storage system, wherein a logical device of the plurality of logical devices is exposed by the storage system to the host over the first IO path which includes the first storage system port and which includes the physical link that is faulty, and wherein said executable code that performs said fault processing includes:

executable code that determines whether the logical device, which is exposed to the host over the first storage system port of the physical link that is faulty, is exposed to the host by the storage system over a first plurality of paths including the first IO path and at least one additional IO path between the host and the storage system;

executable code that determines whether the host supports multi-path processing and includes a multi-path driver that, for each I/O directed to the logical device exposed to the host over the first plurality of paths, selects a particular one of the first plurality of paths to be used for sending said each I/O from the host to the storage system;

executable code that, responsive to determining that the host does not support multi-path processing and does not include the multi-path driver, determines not the reduce the first defined bandwidth threshold for the first IO path; and executable code that, responsive to determining that the logical device is not exposed to the host over the first plurality of paths including the first IO path with the physical link that is faulty at least one additional IO path between the host and the storage system, determines not to reduce the first defined bandwidth threshold for the first IO path.

10. The non-transitory computer-readable media of claim 9, the software further comprising:

executable code that, after receiving the first notification at the storage system from the switch, receives a second notification from the switch indicating that there is congestion on the physical link, wherein the second notification is generated by, and originates from, the switch; and executable code that, for each of the plurality of IO paths that includes the first storage system port, controls further reducing the defined bandwidth threshold for said each IO path in response to receiving the second notification.

11. The non-transitory computer-readable media of claim 9, the software further comprising:

executable code that determines, after receiving the first notification at the storage system from the switch, that there has not been received in a predefined amount of time another notification from the switch indicating that there is congestion on the physical link; and executable code that, for each of the plurality of IO paths that includes the first storage system port, increases the defined bandwidth threshold for said each IO path in response to the determination that the another notification has not been received in the predefined amount of time, wherein the another notification is generated by, and originates from, the switch.

12. The method of claim 1, wherein subsequent to said reducing, the method includes performing first processing comprising:

determining that there is currently no congestion on the physical link;

responsive to determining that there is currently no congestion on the physical link, determining, for each of the plurality of IO paths including the first storage system port, whether the defined bandwidth threshold of said each IO path is at a maximum bandwidth value for said each IO path; and for each of the plurality of IO paths, responsive to determining that the defined bandwidth threshold of said each IO path is not at the maximum bandwidth value for said each IO path, increasing the defined bandwidth threshold of said each IO path.

13. The method of claim 1, wherein the storage system negotiates a first negotiated maximum bandwidth or throughput threshold for the physical link between the first switch port and the first storage system port, wherein the host negotiates a second negotiated maximum bandwidth or throughput threshold for a second physical link of the first IO path, wherein the second physical link is between the first host port of the host and a second switch port of the switch, wherein the first negotiated maximum bandwidth or throughput threshold of the physical link is larger than the second negotiated maximum bandwidth or throughput threshold of the second physical link, and wherein said setting includes the storage system setting the first defined bandwidth threshold for the first IO path to be a minimum with respect to all negotiated maximum bandwidth or throughput thresholds of all physical links in the first IO path.

14. The method of claim 1, wherein the switch detects congestion on the physical link between the first switch port of the switch and the first storage system port of the storage system, and the switch generates the first notification and sends the first notification from the switch to the storage system responsive to the switch detecting congestion on the physical link between the first switch port of the switch and the first storage system port of the storage system.

15. The method of claim 1, wherein said fault processing further incudes:

responsive to determining that the host does support multi-pathing and includes the multi-path driver and determining that the logical device is exposed to the host over the first plurality of paths, reducing the first defined bandwidth threshold for the first IO path.

16. The method of claim 1, wherein the physical link is faulty in that the physical link exhibits faulty IO communications resulting in errors requiring resending the IO communications.

17. The method of claim 1, wherein the physical link being faulty and the physical link being congested denote two separate conditions with respect to the physical link.

* * * * *